(12) United States Patent
Chen

(10) Patent No.: US 8,792,063 B2
(45) Date of Patent: Jul. 29, 2014

(54) ARRAY SUBSTRATE, LIQUID CRYSTAL DISPLAY DEVICE AND METHODS FOR MANUFACTURING AND REPAIRING THE ARRAY SUBSTRATE

(75) Inventor: Hungjui Chen, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 291 days.

(21) Appl. No.: 13/376,030

(22) PCT Filed: Sep. 26, 2011

(86) PCT No.: PCT/CN2011/080191
§ 371 (c)(1),
(2), (4) Date: Dec. 2, 2011

(87) PCT Pub. No.: WO2013/040798
PCT Pub. Date: Mar. 28, 2013

(65) Prior Publication Data
US 2013/0070175 A1  Mar. 21, 2013

(30) Foreign Application Priority Data
Sep. 20, 2011 (CN) .......................... 2011 1 0279994

(51) Int. Cl.
*G02F 1/1343* (2006.01)
*G02F 1/1333* (2006.01)
*G02F 1/136* (2006.01)

(52) U.S. Cl.
CPC ...................................... *G02F 1/136* (2013.01)
USPC ................. 349/38; 349/54; 349/55; 349/192; 257/59; 257/72

(58) Field of Classification Search
USPC ...................... 349/38, 54, 55, 192; 257/59, 72
See application file for complete search history.

(56) References Cited

U.S. PATENT DOCUMENTS

2004/0246393 A1* 12/2004 Elliott et al. .................... 349/42
2009/0195718 A1*  8/2009 He et al. .......................... 349/38

FOREIGN PATENT DOCUMENTS

| CN | 1991539 A | 7/2007 |
| CN | 101114092 A | 1/2008 |

(Continued)

OTHER PUBLICATIONS

Zhong Yanxin, the first office action, Oct. 2012, CN.

(Continued)

*Primary Examiner* — Michael Caley
(74) *Attorney, Agent, or Firm* — IPro, Inc.; Na Xu

(57) ABSTRACT

The present invention discloses an array substrate, a liquid crystal display (LCD) device and methods for manufacturing and repairing the array substrate. Said array substrate for thin film transistor (TFT) LCD comprises one or more pixel electrodes, gate lines and data lines; the crossover of said gate line and said data line is formed with a parasitic capacitor; said data line is also provided with slit part; and said slit part is overlapped with the gate line to form a protective capacitor which is in parallel connection with said parasitic capacitor and of which the voltage resistance is less than said parasitic capacitor. Because the data line is provided with the slit part which overlaps the gate line to form the protective capacitor which is in parallel connection with the parasitic capacitor and of which the voltage resistance is less than that of the protective capacitor, and because the data line is positioned on the top layer, the late stage repair of the present invention becomes easier.

15 Claims, 6 Drawing Sheets

(56) References Cited

FOREIGN PATENT DOCUMENTS

| CN | 101452164 A | 6/2009 |
|---|---|---|
| CN | 101504500 A | 8/2009 |

OTHER PUBLICATIONS

Zhou Yu, the International Searching Authority written comments, May 2012, CN.
Zhong Yanxin, the second office action, Jun. 2013, CN.

* cited by examiner

ARRAY SUBSTRATE, LIQUID CRYSTAL DISPLAY DEVICE AND METHODS FOR MANUFACTURING AND REPAIRING THE ARRAY SUBSTRATE

TECHNICAL FIELD

The present invention relates to the field of liquid crystal displays (LCDs), particularly to an array substrate, a LCD device and methods for manufacturing and repairing the array substrate.

BACKGROUND

The prior art is shown in FIG. 1; the LCD device comprises a liquid crystal panel; the liquid crystal panel comprises an array substrate; said array substrate comprises multiple film crystals, pixel electrodes connected with the drain electrodes of the film crystals, gate lines connected with the gate electrodes of the film crystals, and data lines connected with the source electrodes of the film crystals; in the process, the crossover of the gate electrode and the source electrode of each said film crystal is formed with a parasitic capacitor. When charges are continuously gathered, electro static discharge (ESD) breakdown occurs easily which cause short-circuit of the each gird line and data line (poor DGS line). While protective measures are not provided for the parasitic capacitor on which ESD breakdown easily occurs, once it is broken down, the parasitic capacitor is difficult to repair because of its position, leading to poor reliability. Thus, the overall liquid crystal panel is scrapped, and unnecessary waste is produced. The patent of invention CN200810057694.7 discloses a pixel structure of the array substrate for thin film transistor (TFT) LCD. The technical scheme uses the gate lines to overlap the data lines to form a protective capacitor which is in parallel connection with the parasitic capacitor; and because the distance between the two electrodes of the protective capacitor is less than that of the parasitic capacitor, a characteristic is provided that the voltage resistance of the protective capacitor is less than that of the parasitic capacitor. Thus, when ESD occurs, the protective capacitor is broken down first so that the parasitic capacitor is protected. The technical scheme solves the problem of the ESD breakdown of the parasitic capacitor, but also has some problems. In the array substrate manufactured by five-mask processes, the gate line is positioned on the bottom layer; the first insulating layer, the data line, the second insulating layer are sequentially arranged above the gate line. Once the protective capacitor is broken down, the difficulty of repair increases.

SUMMARY

The aim of the present invention is to provide an array substrate with low-cost protective capacitor that is easy to repair, a LCD device, and methods for manufacturing and repairing the array substrate.

The purpose of the present invention is achieved by the following technical schemes.

An array substrate for TFT LCD comprises one or more pixel electrodes, one or more gate lines and one or more data lines; the crossover of said gate line and said data line is formed with a parasitic capacitor; said data line is also provided with slit part; said slit part overlaps the gate line to form a protective capacitor which is in parallel connection with said parasitic capacitor; and the voltage resistance of said protective capacitor is less than said parasitic capacitor.

Preferably, the distance between the two electrodes of said protective capacitor is less than the distance between the two electrodes of said parasitic capacitor. An embodiment is that the voltage resistance of the protective capacitor is less than that of the parasitic capacitor, and the voltage resistance can be reduced by shortening the distance between the two electrodes of the capacitor.

Preferably, said protective capacitor and said parasitic capacitor are formed on the same gate line. The gate line does not produce slit part; the overlap of the extended slit part of the corresponding data line and said gate line forms the protective capacitor. Thus, the process becomes simple.

Preferably, the opposite area of the two electrodes of said protective capacitor is more than that of the two electrodes of said parasitic capacitor. Another embodiment is that the voltage resistance of the protective capacitor is less than that of the parasitic capacitor, and the voltage resistance can be reduced by increasing the opposite area between the two electrodes of the capacitor.

Preferably, the opposite area of the two electrodes of said protective capacitor is more than that of the two electrodes of said parasitic capacitor; and the distance between the two electrodes of said protective capacitor is less than the distance between the two electrodes of said parasitic capacitor. The technical scheme for increasing the opposite area between the two electrodes of the capacitor is used on the basis of the array substrate for TFT LCD manufactured by five-mask processes.

Preferably, the distance between the two electrodes of said protective capacitor is equal to the distance between the two electrodes of said parasitic capacitor. The technical scheme for increasing the opposite area between the two electrodes of the capacitor is used on the basis of the array substrate for TFT LCD manufactured by four-mask processes.

A LCD device, wherein said LCD device comprises the aforementioned array substrate for TFT LCD.

A method for manufacturing the array substrate for TFT LCD comprises the following steps:

A: forming one or more gate lines and gate electrodes on the array substrate by film forming, exposing and etching process; and B: directly depositing the insulating layer, forming active layer pattern, data line, slit part, source electrode and drain electrode by film forming, exposing and etching process; overlapping said data lines with said gate lines to form the parasitic capacitor; and overlapping said slit part with the corresponding gate line to form the protective capacitor which is in parallel connection with said parasitic capacitor, and of which the voltage resistance is less than that of said parasitic capacitor.

Preferably, a method for manufacturing the array substrate for TFT LCD, wherein the step B of the method comprises the following steps:

B1: directly depositing the insulating layer, and forming the active layer pattern in the position corresponding to said gate lines by film forming, exposing and etching process; and B2: forming the data lines, slit parts, source electrodes and drain electrodes by film forming, exposing and etching process; overlapping said data lines with said gate lines to form the parasitic capacitor; and overlapping said slit part with the corresponding gate lines to form the protective capacitor which is in parallel connection with said parasitic capacitor, and of which the voltage resistance is less than that of said parasitic capacitor. This is a method for manufacturing the array substrate for TFT LCD manufactured by five-mask processes.

An aforementioned method for repairing the array substrate for TFT LCD comprises the following steps:

A: positioning the broken down protective capacitor; and

B: cutting off the corresponding slit part of said protective capacitor.

Because the data line is provided with the slit part which overlaps the gate line to form the protective capacitor, which is in parallel connection with the parasitic capacitor and of which the voltage resistance is less than that of the protective capacitor, when ESD occurs, the protective capacitor is broken down first, and then the breakdown probability of the parasitic capacitor is reduced; because the protective capacitor is freely positioned, the broken down protective capacitor can be conveniently repaired by the cutting-off mode so that the slit line of the data line is disconnected from the data line to ensure that the overall pixel normally operates, and the reliability of the LCD device is increased. Because the data line is positioned on the top layer, it is easy to repair in later period.

DETAILED DESCRIPTION

The present invention will further be described in detail in accordance with the figures and the preferred embodiments.

Figure 1:
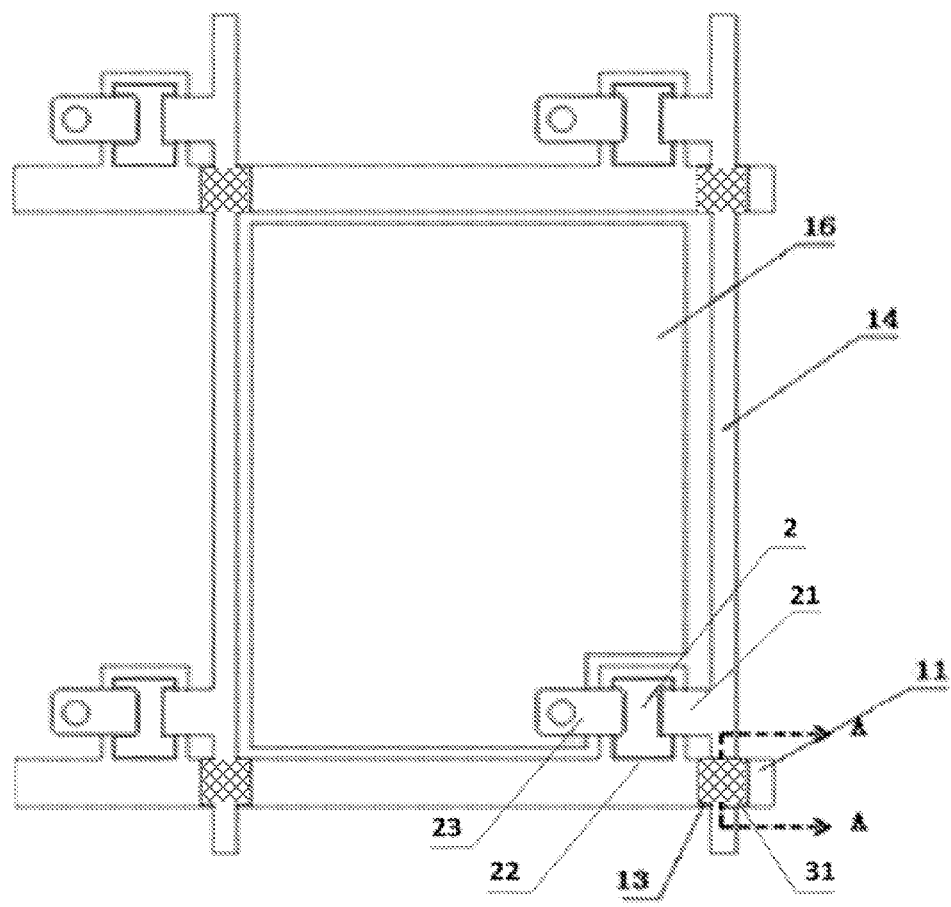
FIG. 1 is the schematic diagram of the array substrate in the prior art.
Figure 2:
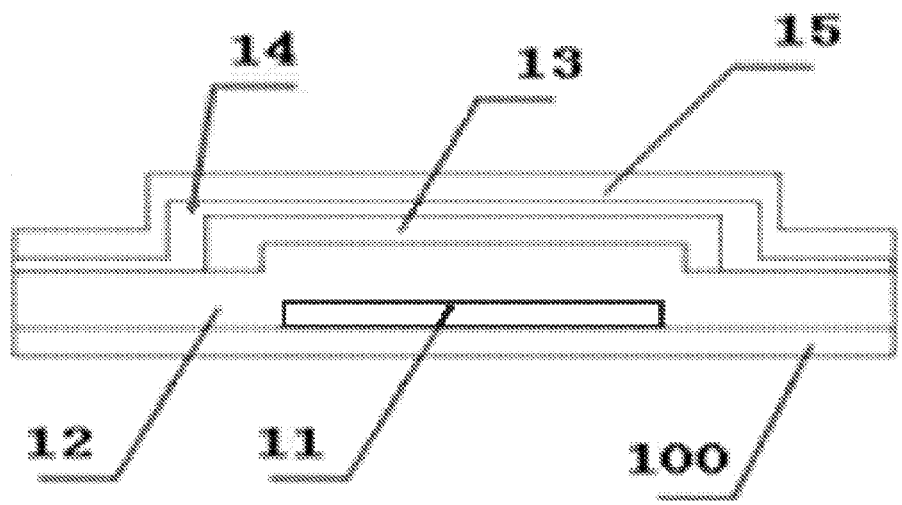
FIG. 2 is the sectional view of the array substrate in the prior art in the A-A direction.
Figure 3:
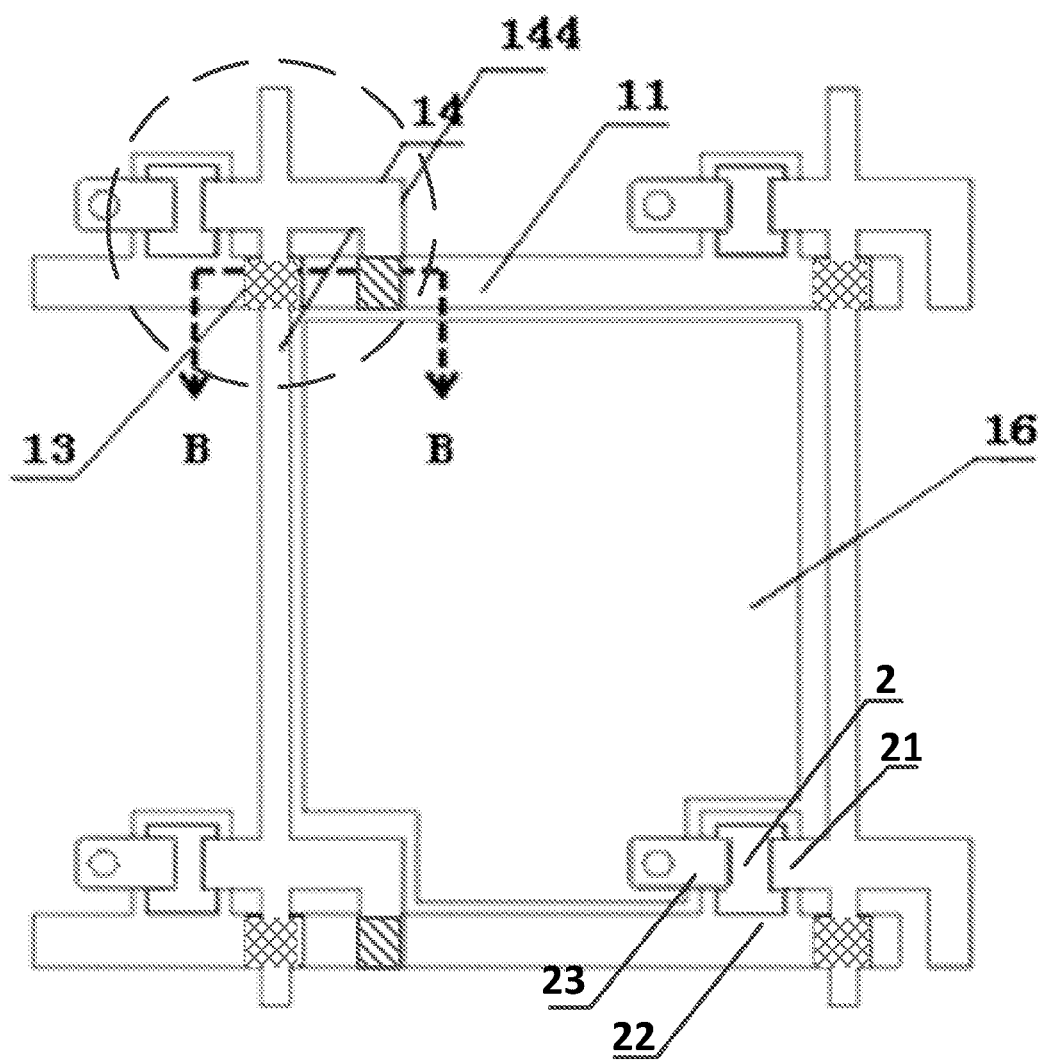
FIG. 3 is the schematic diagram of the array substrate of the present invention.

As show in FIG. 3, a LCD device comprises an array substrate; said array substrate comprises multiple film crystals 2; each film crystal comprises a source electrode 21 connected with the data line 14, a gate electrode 22 connected with the gate line 11, and a drain electrode 23 connected with the pixel electrode 16; wherein the crossover of the corresponding data line 14 and gate line 11 is formed with a parasitic capacitor 31 by said gate electrode 22 and said source electrode 21; said data line 14 is also provided with slit part 144; the crossover of said slit part 144 and said gate line 22 is formed with a protective capacitor 32 which is in parallel connection with said parasitic capacitor 31; and the voltage resistance of said protective capacitor 32 is less than that of said parasitic capacitor. The invention will further be described in detail in accordance the preferred embodiments.

Embodiment 1

Figure 4:
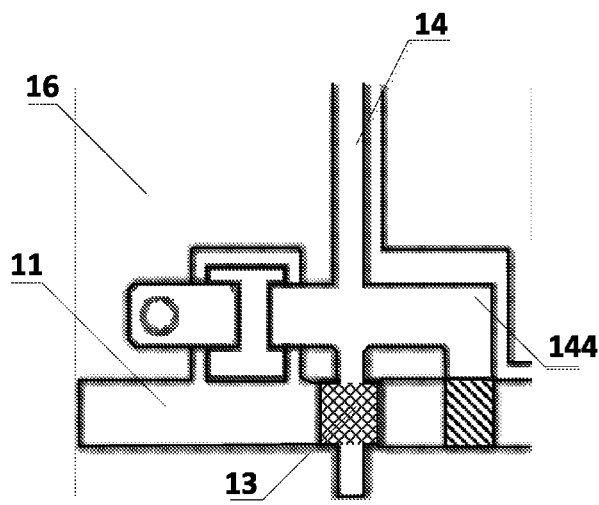
FIG. 4 is the partial enlarged view of the present invention.
Figure 5:
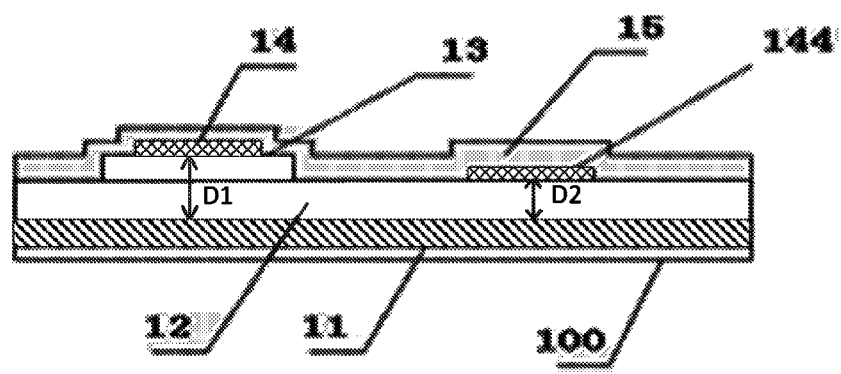
FIG. 5 is the sectional view of the array substrate of the present invention in the B-B direction.
Figure 6:
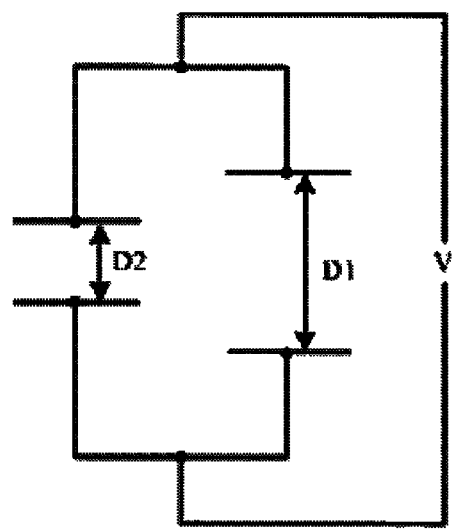
FIG. 6 is the equivalent circuit diagram of the parasitic capacitor and the protective capacitor of the present invention.

The embodiment of the array substrate for TFT LCD manufactured by five-mask processes of the LCD device. As shown in FIG. 4 to FIG. 6, the data line of the source electrode 21 of each film crystal 2 is externally extended to form the slit part 144; the slit part 144 is bent to the adjacent gate line 11 until the slit part 144 overlaps said gate line 11; and the crossover is formed with said protective capacitor 32; namely said protective capacitor 32 and said parasitic capacitor 31 are formed on the same gate line. Because one gate line 11 is shared by one end of the parasitic capacitor 31 and the protective capacitor 32, and because the other end of the parasitic capacitor 31 is communicated with said source electrode 21, namely is communicated with the slit part 144, said parasitic capacitor 31 is in electrically parallel connection with the protective capacitor 32.

As shown in FIG. 5, said array substrate sequentially comprises the glass substrate 100, the gate line 11, the insulating layer 12, the data line 14 and the protective layer 15 from bottom to top, wherein the slit part 144 and the data line 14 are positioned on the same layer. The crossover of said gate line 11 and the data line 14 is also provided with an active layer 13, and the crossover of the slit part 144 and the gate line 11 is not provided with an active layer. Therefore, the comparison of distance D1, between the data line 14 and the gate line which form the parasitic capacitor, with the distance D2, between the slit part 144 and the gate line 11 which form the protective capacitor, shows that D1>D2. As shown in the equivalent circuit diagram of FIG. 5, the protective capacitor 32 is in parallel connection with the parasitic capacitor 31; the voltages V at both ends of each of the two capacitors are the same; in accordance with the electric field intensity formula:

$$E = \text{voltage } V/\text{distance } D \text{ between the two electrodes;}$$

the less the D is, the more the electric field E is, and the more easily the capacitor is broken down. Therefore, when ESD breakdown occurs, it is easier to break down the protective capacitor 32 than the parasitic capacitor 31. That is to say, when the static electricity existing on the gate line 11 and the data line 14 achieves critical value, the protective capacitor 32 of the present invention will be broken down; thus, the static electricity is discharged, and the original parasitic capacitor 31 is protected. Because the protective capacitor is freely positioned, the broken down protective capacitor 32 can be repaired through laser so that the slit part 144 is disconnected from the data line 14 to ensure that the overall pixel normally operates.

The method for manufacturing the array substrate for TFT LCD manufactured by five-mask processes comprises the following steps:

A: forming gate line and gate electrode on the array substrate by film forming, exposing and etching process;

B1: directly depositing the insulating layer, forming an active layer pattern in the position corresponding to said gate line by film forming, exposing and etching process;

B2: forming data line, slit part, source electrode and drain electrode by film forming, exposing and etching process; overlapping said data line with said gate line to form the parasitic capacitor; and overlapping said slit part with the corresponding gate line to form the protective capacitor which is in parallel connection with said parasitic capacitor and of which the voltage resistance is less than that of said parasitic capacitor.

C: forming through-hole by film forming, exposing and etching process; and

D: forming pixel electrode by film forming, exposing and etching process, and communicating the pixel electrode with the source electrode through the through-hole.

Said method for repairing the array substrate for TFT LCD comprises the following steps:

A: positioning the broken down protective capacitor; and

B: cutting off the corresponding slit part of said protective capacitor by laser and the like.

Embodiment 2

The embodiment of the array substrate for TFT LCD manufactured by four-mask processes. As shown in FIG. 4, the data line of the source electrode 21 of each film crystal 2 is externally extended to form the slit part 144; the slit part 144 is bent to the adjacent gate line 11 until the slit part 144 overlaps said gate line 11; and the crossover is formed with said protective capacitor 32, namely said protective capacitor 32 and said parasitic capacitor 31 are formed on the same gate line. Because one gate line 11 is shared by one end of the parasitic capacitor 31 and the protective capacitor 32, and because the other end of the parasitic capacitor 31 is communicated with said source electrode 21, namely is communicated with the slit part 144, said parasitic capacitor 31 is in electrically parallel connection with the protective capacitor 32.

Figure 7:
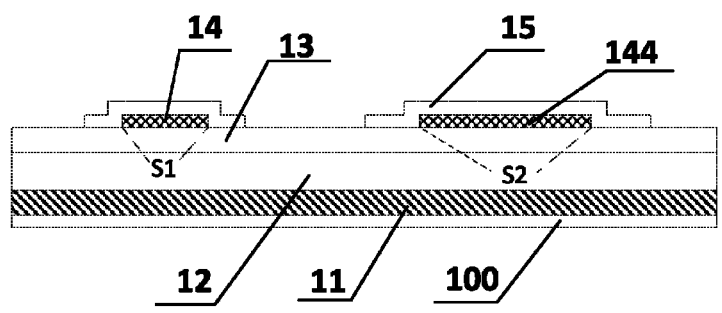
FIG. 7 is the sectional view of the array substrate of a second example of the present invention.

As shown in FIG. 7, said array substrate sequentially comprises the glass substrate 100, the gate line 11, the insulating layer 12, the data line 14 and the protective layer 15 from bottom to top, wherein the slit part 144 and the data line 14 are positioned on the same layer. It is found from the comparison that an active layer 13 and an insulating layer are respectively arranged between the data line 14 and the gate line which form the parasitic capacitor, and the slit part 144 and the gate line 11 which form the protective capacitor. Thus, the distance between two electrodes of the protective capacitor is equal to the distance between the two electrodes of the parasitic capacitor, but the opposite area S2 of the two electrodes of the protective capacitor 32 is larger than the opposite area. S1 of the two electrodes of said parasitic capacitor 31.

Figure 8:
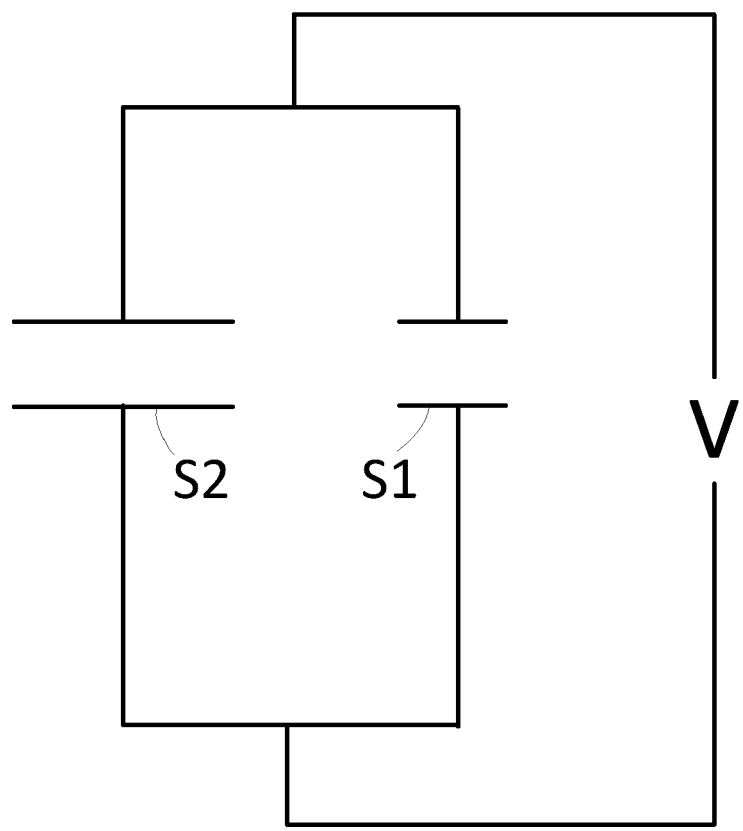
FIG. 8 is the equivalent circuit diagram of the parasitic capacitor and the protective capacitor of a second example of the present invention Wherein: 100. glass substrate; 11. gate line; 12. insulating layer; 13. active layer; 14. data line; 15. protective layer; 16. pixel electrode; 144. slit line of data line; 2. film crystal; 21. source electrode; 22. gate electrode; 23. drain electrode; 31. parasitic capacitor; 32. protective capacitor.

As shown in the equivalent circuit diagram of FIG. 8, the protective capacitor 32 is in parallel connection with the parasitic capacitor 31, and the opposite area S2 of the two electrodes of the protective capacitor 32 is larger than the opposite area. S1 of the two electrodes of said parasitic capacitor 31; under the conditions of the same voltage, the same medium and the same distance, the breakdown time of the capacitor is shortened with the increase of the electrode area of the capacitor. Therefore, when static voltage difference is produced, the protective capacitor 32 will be broken down before the parasitic capacitor 31 so that the parasitic capacitor is protected.

In the prior art, in order to achieve the purpose that the distance of the protective capacitor is less than that of the parasitic capacitor in the array substrate manufactured by four-mask processes, the slit part of the gate line is required to be divided into an extension part and a wire part which are positioned on different layers, and the two parts are electrically connected through the through-hole. Thus, multiple process steps should be added so that the cost becomes higher. While using the scheme of the present invention, because the slit part and the data line are positioned on the same layer, the manufacturing procedures of the existing array substrate will not be additionally added, the manufacture becomes simpler, and the cost becomes lower.

It is known from the analysis of the embodiment 1 that the shortened distance of the capacitor can shorten the breakdown time of the capacitor. In the embodiment, the breakdown time of the capacitor can also be shortened by increasing the opposite area of the capacitor. Therefore, the embodiment is also applied to the array substrate for TFT LCD manufactured by five-mask processes, and better protective effect is obtained if the embodiment is matched with the shortened distance. Because embodiment 1 describes the structure of the array substrate for TFT LCD manufactured by five-mask processes and methods for manufacturing and repairing the array substrate in detail, this embodiment will not give unnecessary details.

The method for manufacturing the array substrate for TFT LCD manufactured by five-mask processes comprises the following steps:

A: forming gate line and gate electrode on the array substrate by film forming, exposing and etching process;

B: directly depositing the insulating layer, forming active layer pattern, data line, slit part, source electrode and drain electrode by film forming, exposing and etching process; overlapping said data line with said gate line to form the parasitic capacitor; and overlapping said slit part with the corresponding gate line to form the protective capacitor which is in parallel connection with said parasitic capacitor and of which the voltage resistance is less than that of said parasitic capacitor.

C: forming through-hole by film forming, exposing and etching process; and

D: forming pixel electrode by film forming, exposing and etching process, and communicating the pixel electrode with the source electrode through the through-hole.

The present invention is described in detail in accordance with the above contents with the specific preferred embodiments. However, this invention is not limited to the specific embodiments. For the ordinary technical personnel of the technical field of the present invention, on the premise of keeping the conception of the present invention, the technical personnel can also make simple deductions or replacements, and all of which should be considered to belong to the protection scope of the present invention.

I claim:

1. An array substrate for a thin film transistor (TFT) liquid crystal display (LCD), comprising: one or more gate lines and data lines; a crossover of said gate line and said data line is formed with a parasitic capacitor; said data line is provided with a branch portion; the crossover of said a branch portion and said gate line is formed with a protective capacitor which is in parallel connection with said parasitic capacitor; and the voltage resistance of said protective capacitor is less than that of said parasitic capacitor, wherein the opposite area of the two electrodes of said protective capacitor is larger than the opposite area of the two electrodes of said parasitic capacitor.

2. The array substrate for the TFT LCD of claim 1, wherein a distance between the two electrodes of said protective capacitor is less than the distance between the two electrodes of said parasitic capacitor.

3. The array substrate for the TFT LCD of claim 2, wherein said protective capacitor and said parasitic capacitor are formed on the same gate line.

4. The array substrate for the TFT LCD of claim 1, wherein a distance between the two electrodes of said protective capacitor is less than the distance between the two electrodes of said parasitic capacitor.

5. The array substrate for the TFT LCD of claim 1, wherein a distance between the two electrodes of said protective capacitor is equal to the distance between the two electrodes of said parasitic capacitor.

6. A LCD device that comprises an TFT LCD array substrate, said TFT LCD array substrate comprises: one or more gate lines and data lines; a crossover of said gate line and said data line is formed with a parasitic capacitor; said data line is provided with a branch portion; the crossover of said a branch portion and said gate line is formed with a protective capacitor which is in parallel connection with said parasitic capacitor; and the voltage resistance of said protective capacitor is less than that of said parasitic capacitor, wherein the opposite area of the two electrodes of said protective capacitor is larger than the opposite area of the two electrodes of said parasitic capacitor.

7. The LCD device of claim 6, wherein a distance between the two electrodes of said protective capacitor is less than the distance between the two electrodes of said parasitic capacitor.

8. The LCD device of claim 7, wherein said protective capacitor and said parasitic capacitor are formed on the same gate line.

9. The LCD device of claim 6, wherein a distance between the two electrodes of said protective capacitor is less than the distance between the two electrodes of said parasitic capacitor.

10. The LCD device of claim 6, wherein a distance between the two electrodes of said protective capacitor is equal to the distance between the two electrodes of said parasitic capacitor.

11. A method for repairing an array substrate for an TFT LCD, wherein said array substrate for the TFT LCD comprises one or more gate lines and data lines; the crossover of said gate line and said data line is formed with a parasitic capacitor; said data line is provided with a branch portion; a crossover of said a branch portion and said gate line is formed with a protective capacitor which is in parallel connection with said parasitic capacitor; the voltage resistance of said protective capacitor is less than that of said parasitic capacitor, wherein the opposite area of the two electrodes of said protective capacitor is larger than the opposite area of the two electrodes of said parasitic capacitor; and said method comprises the following steps:
   A: positioning the broken down protective capacitor; and
   B: cutting off the corresponding slit part a branch portion of said protective capacitor.

12. The method of claim 11 for repairing the array substrate for the TFT LCD, wherein a distance between the two electrodes of said protective capacitor is less than the distance between the two electrodes of said parasitic capacitor.

13. The method of claim 12 for repairing the array substrate for the TFT LCD, wherein said protective capacitor and said parasitic capacitor are formed on the same gate line.

14. The method of claim 11 for repairing the array substrate for the TFT LCD, wherein a distance between the two electrodes of said protective capacitor is less than the distance between the two electrodes of said parasitic capacitor.

15. The method of claim 11 for repairing the array substrate for the TFT LCD, wherein a distance between the two electrodes of said protective capacitor is equal to the distance between the two electrodes of said parasitic capacitor.

* * * * *